(12) United States Patent
Tovinger

(10) Patent No.: US 10,148,486 B2
(45) Date of Patent: Dec. 4, 2018

(54) OBJECT VERSION MANAGEMENT

(75) Inventor: Thomas Antero Tovinger, Västra Frölunda (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 864 days.

(21) Appl. No.: 14/399,130

(22) PCT Filed: Sep. 14, 2012

(86) PCT No.: PCT/EP2012/068122
§ 371 (c)(1),
(2), (4) Date: Nov. 5, 2014

(87) PCT Pub. No.: WO2013/167207
PCT Pub. Date: Nov. 14, 2013

(65) Prior Publication Data
US 2015/0127798 A1 May 7, 2015

Related U.S. Application Data

(60) Provisional application No. 61/643,475, filed on May 7, 2012.

(51) Int. Cl.
*H04L 12/24* (2006.01)
*G06F 8/71* (2018.01)
(Continued)

(52) U.S. Cl.
CPC .............. *H04L 41/044* (2013.01); *G06F 8/71* (2013.01); *G06F 9/44536* (2013.01); *H04L 41/0233* (2013.01); *H04L 67/16* (2013.01)

(58) Field of Classification Search
CPC ... H04L 67/16; H04L 41/0233; H04L 41/044; G06F 8/71
(Continued)

(56) References Cited

U.S. PATENT DOCUMENTS 5,586,255 A * 12/1996 Tanaka ................ H04L 41/0213
709/223
6,226,788 B1 * 5/2001 Schoening .......... H04L 41/0213
709/203

(Continued)

OTHER PUBLICATIONS

International Search Report, Application No. PCT/EP2012/068122, dated Jan. 30, 2013.
(Continued)

*Primary Examiner* — Kevin T Bates
*Assistant Examiner* — Ronak Patel
(74) *Attorney, Agent, or Firm* — Sage Patent Group

(57) ABSTRACT

Object-oriented network management includes defining an information model with one object class for each type of network resource and network entity to be managed. A hierarchy tree with a plurality of hierarchy levels is defined independent from an inheritance hierarchy. Each object class is assigned to one hierarchy level, and each object class of a lower hierarchy level is associated to one object class of a hierarchy level above the lower hierarchy level. An information entity including default version information is defined in the information model. The information entity is associated to one object class of a top hierarchy level or an instance thereof. An assumption is defined that the default version information for an instance of one object class and for all instances of an object class that belongs to lower hierarchy levels and that are associated to the one object class, or an instance thereof.

17 Claims, 11 Drawing Sheets

(51) Int. Cl.
    *G06F 9/445*     (2018.01)
    *H04L 29/08*     (2006.01)

(58) Field of Classification Search
    USPC .......................................................... 709/223
    See application file for complete search history.

(56) References Cited

U.S. PATENT DOCUMENTS

| | | | |
|---|---|---|---|
| 6,317,748 | B1 | 11/2001 | Menzies et al. |
| 6,944,657 | B1* | 9/2005 | Taghadoss .......... H04L 41/0681 |
| | | | 709/223 |
| 6,968,340 | B1* | 11/2005 | Knowles ................... G06F 8/10 |
| 7,783,720 | B1 | 8/2010 | Allavarpu et al. |
| 7,860,959 | B1 | 12/2010 | Karpati et al. |
| 2003/0133556 | A1* | 7/2003 | Naik ...................... H04L 41/082 |
| | | | 379/201.12 |
| 2004/0158583 | A1* | 8/2004 | Kaappa ............. G06F 17/30938 |
| 2006/0070082 | A1* | 3/2006 | Sridhar ..................... G06F 8/41 |
| | | | 719/318 |
| 2008/0147838 | A1* | 6/2008 | Hirsch ................... H04L 41/28 |
| | | | 709/223 |

OTHER PUBLICATIONS

Written Opinion of the International Searching Authority, Application No. PCT/EP2012/068122, dated Jan. 30, 2013.

3GPP, Technical Specification—"3rd Generation Partnership Project; Technical Specification Group Services and System Aspects; Telecommunication management; Integration Reference Point (IRP) Concept and definitions (Release 11)", 3GPP TS 32.150 V11.1.0 (Dec. 2012), 26 pp.

3GPP, Technical Specification—"3rd Generation Partnership Project; Technical Specification Group Services and System Aspects; Telecommunication management; Integration Reference Point (IRP) Information Service (IS) Unified Modelling Language (UML) repertoire (Release 11)", 3GPP TS 32.152 V11.1.0 (Dec. 2012), 24 pp.

3GPP, Technical Specification—"3rd Generation Partnership Project; Technical Specification Group Services and System Aspects; Telecommunication management; Configuration Management (CM); Name convention for Managed Objects (Release 11)", 3GPP TS 32.300 V11.2.0 (Jun. 2013), 27 pp.

3GPP, Technical Specification—"3rd Generation Partnership Project; Technical Specification Group Services and System Aspects; Telecommunication management; Configuration Management (CM); Generic network resources Integration Reference Point (IRP); Network Resource Model (NRM) (Release 11)", 3GPP TS 32.622 V11.1.0 (Jun. 2013), 29 pp.

3GPP, Technical Specification—"3rd Generation Partnership Project; Technical Specification Group Services and System Aspects; Telecommunication management; Configuration Management (CM); Generic Network Resources Integration Reference Point (IRP); Solution Set (SS) definitions (Release 11)", 3GPP TS 32.626 V11.1.0 (Dec. 2012), 23 pp.

3GPP, Technical Specification—"3rd Generation Partnership Project; Technical Specification Group Services and System Aspects; Telecommunication management; Inventory Management (IM) network resources Integration Reference Point (IRP); Network Resource Model (NRM) (Release 11)", 3GPP TS 32.692 V11.0.0 (Sep. 2012), 26 pp.

3GPP, Technical Specification—"3rd Generation Partnership Project; Technical Specification Group Services and System Aspects; Telecommunication management; Configuration Management (CM); Transport Network (TN) interface Network Resource Model (NRM) Integration Reference Point (IRP); Information Service (IS) (Release 11)", 3GPP TS 32.712 V11.0.0 (Sep. 2012), 17 pp.

3GPP, Technical Specification—"3rd Generation Partnership Project; Technical Specification Group Services and System Aspects; Telecommunication management; Configuration Management (CM); Transport Network (TN) interface Network Resource Model (NRM) Integration Reference Point (IRP); Solution Set (SS) definitions (Release 11)", 3GPP TS 32.716 V11.0.0 (Sep. 2012), 19 pp.

3GPP, Technical Specification—"3rd Generation Partnership Project; Technical Specification Group Services and System Aspects; Telecommunication management; Configuration Management (CM); Signalling Transport Network (STN) interface Network Resource Model (NRM) Integration Reference Point (IRP); Information Service (IS) (Release 11)", 3GPP TS 32.742 V11.0.0 (Sep. 2012), 28 pp.

3GPP, Technical Specification—"3rd Generation Partnership Project; Technical Specification Group Services and System Aspects; Telecommunication management; Configuration Management (CM); Signalling Transport Network (STN) Interface Network Resource Model (NRM) Integration Reference Point (IRP); Solution Set (SS) definitions (Release 11)", 3GPP TS 32.746 V11.0.0 (2012-09), 26 pp.

3GPP, Technical Specification—"3rd Generation Partnership Project; Technical Specification Group Services and System Aspects; Telecommunication management; Evolved Universal Terrestrial Radio Access Network (E-UTRAN) Network Resource Model (NRM) Integration Reference Point (IRP); Information Service (IS) (Release 10)", 3GPP TS 32.762 V10.5.0 (Sep. 2011), 56 pp.

3GPP, Technical Specification—"3rd Generation Partnership Project; Technical Specification Group Services and System Aspects; Telecommunication management; Evolved Universal Terrestrial Radio Access Network (E-UTRAN) Network Resource Model (NRM) Integration Reference Point (IRP); Solution Set (SS) definitions (Release 11)", 3GPP TS 32.766 V11.3.0 (Dec. 2012), 48 pp.

3GPP, Technical Report—"3rd Generation Partnership Project; Technical Specification Group Services and System Aspects; Telecommunication management; Study on version handling over Itf-N (Release 10)", 3GPP TR 32.830 V0.3.0 (Nov. 2010), 28 pp.

* cited by examiner

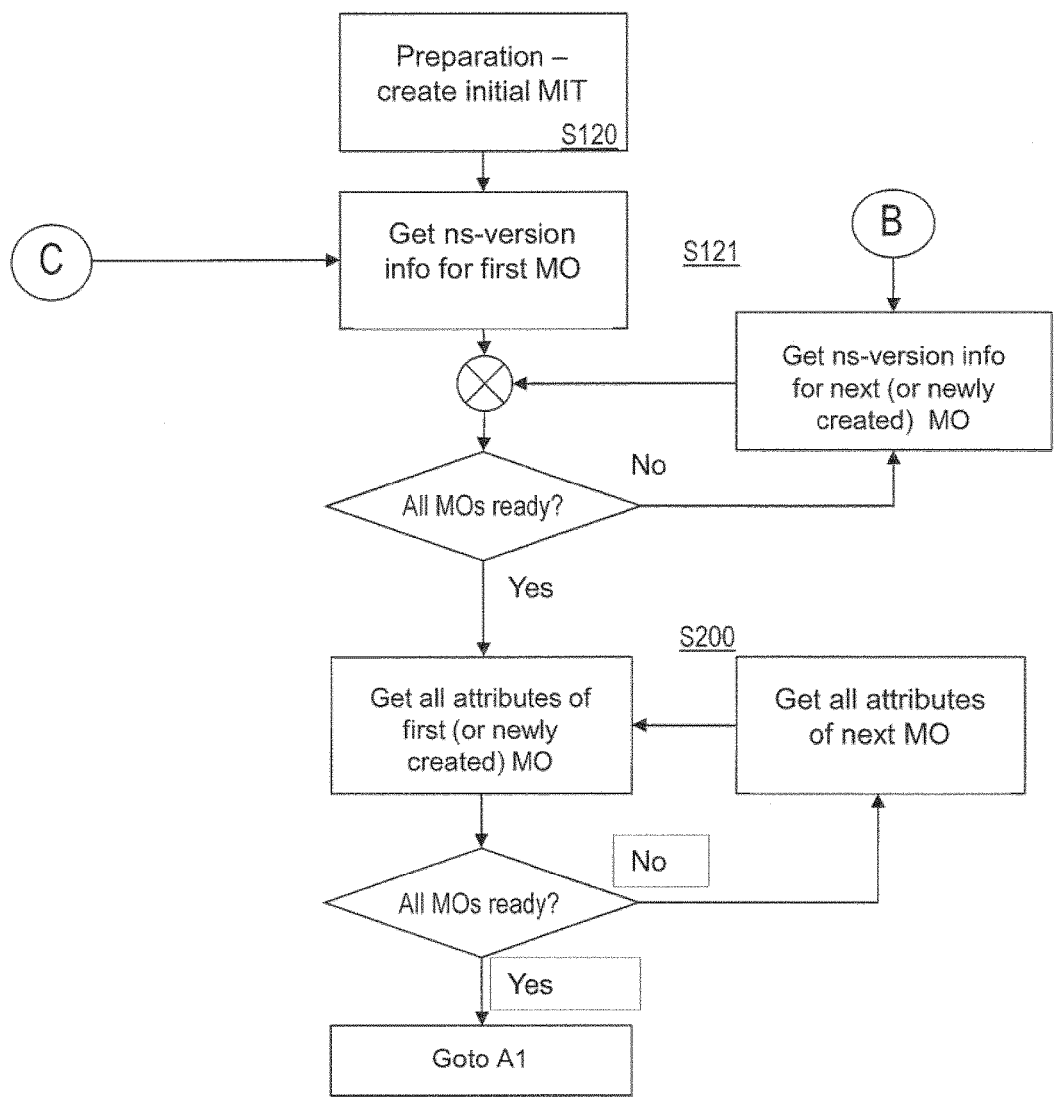

OBJECT VERSION MANAGEMENT

CROSS REFERENCE TO RELATED APPLICATIONS

This application is a 35 U.S.C. § 371 national stage application of PCT International Application No. PCT/EP2012/068122, filed on 14 Sep. 2012, which itself claims priority to U.S. provisional Application No. 61/643,475, filed 7 May 2012, the disclosures and contents of both of which are incorporated by reference herein in their entirety. The above-referenced PCT International Application was published in the English language as International Publication No. WO 2013/167207 A1 on 14 Nov. 2013.

TECHNICAL FIELD

The present invention relates to network management. In particular, the present invention relates to a method for object-oriented network management, a network management entity for object-oriented network management, and corresponding network systems, computer programs, and computer readable media.

BACKGROUND

Present day computer and communication networks have grown to huge systems spanning entire countries or even the entire world. Correspondingly, such networks comprise a huge number of individual network elements like nodes, links, servers, routers, switches, base stations, etc. Such network elements—or: network entities—are geographically spread and are added, removed, or replaced in time.

For example, one part of a communication network is built and set up at one time or during one time period for serving the most populous parts of a country, and, at a later point in time, coverage for remaining parts of the country follows by setting up additional equipment. It should be clear that technology evolves and the equipment that was installed later may be of newer manufacturing as compared to the equipment installed first. For the case of communication networks though, equipment of newer manufacturing date may support a communication standard of a more recent revision than that of the first equipment. As a result, network equipment, network entities or network resources, supporting different standards or revisions thereof coexist.

As a result of this and the aforementioned complexity and vastness of modern network systems, it becomes a challenging task to manage such networks. It is not only necessary to keep track of all entities and resources installed/available, but also information has to be available for the manager on what entity/resource supports what standard(s) or revisions thereof.

The 3rd-Generation Partnership Project (3GPP), involved in standardizing modern telecommunication networks, has a working group "SA5" that has recently defined a number of technical specifications named IRPs (Integration Reference Point) of three different types: NRM (Network Resource Model) IRPs, Interface IRPs and Data Definition IRPs. Each NRM IRP defines a number of Information Object Classes (IOCs) in a technology-independent level specification called Information Service (IS), and each IOC is then mapped to a Managed Object Class (MOC) in one or more technology- and protocol-specific specifications called Solution Set (SS).

Implementations of the NRM IRPs will support access (management) over a 3GPP-standardized interface named Itf-N using one or more of the Interface IRPs, where a so-called IRP Agent allows an IRP Manager to manage network information in the form of Managed Objects (MOs; instances of MOOS). Such a managed object (MO) can be seen as a software object that encapsulates the manageable characteristics and behavior of a particular network entity or network resource.

This IRP agent (in this document normally referred to as "agent") is equivalent to any service providing entity supporting an interface, e.g. a "server" in a "client-server" architecture, and the IRP Manager (in this document normally referred to as "manager") is equivalent to any service consuming entity using an interface, e.g. a "client" in a "client-server" architecture.

These MOs that represent the real network resources in a mobile network that can be managed, e.g. a base station or a radio cell, can be created, configured, read and updated throughout their lifetime until they can be ultimately deleted. Each MO has a unique identification in the form of a Distinguished Name (DN) as defined in 3GPP technical specification (TS) document 32.300. Examples of NRM IRPs can be found 3GPP TS 32.622 (Generic NRM IRP IS) and 32.762 (E-UTRAN NRM IRP IS; from 3GPP Release-12 these are planned to be moved to TS 28.622 and 28.658), and for an overview of the IRP concept and structure, see TS 32.150.

Each implementation of the 3GPP NRM IRPs, as well as any object-oriented information model, will typically be in an telecommunications operations support system and will have a large containment tree of all instantiated MOs contained by the "root" instance. In the 3GPP NRM case this "root" instance can be the so-called "SubNetwork" IOC. The containment tree may well be contained by one of the MOs contained by the "root" instance (e.g. SubNetwork) or further down the containment hierarchy.

Such a containment tree is a structured way of representing the data that can be accessed through an interface, e.g. the standardized interface Itf-N in 3GPP. Containment can be understood as—amongst others—name-containment as defined in 3GPP TS 32.152, building up a structured tree-like hierarchy in arbitrary number of levels by means of the so-called "<<names>>"-relationship. This enables unique identification of each MO by means of a Distinguished Name (DN) as defined in TS 32.300, and it could equally well, in the general case, be any type of aggregation of classes, wherein the above-mentioned name-containment defined in TS 32.152 is one type of aggregation according to UML.

This tree of all instances, from the root SubNetwork instance, including all directly or indirectly contained MOs, down to all "leaves", is referred to as the MIB (Management Information Base). See 3GPP TS 32.622 for the definition of SubNetwork IOC and other high-level and generic IOCs which are used in other domain-specific NRMs. The MIB is made up of instances of classes (in the 3GPP case these are IOCs and MOCs) defined in a number of specifications (in the 3GPP NRM IRP case these are IS and SS specifications, e.g. 32.622/626 (Generic NRM IRP), 32.742/746 (UTRAN NRM IRP), 32.762/766 (E-UTRAN NRM IRP) and 32.712/716 (Transport NRM IRP)).

As already mentioned, the network evolves, and different MOs in the network can be supporting different versions of the standard specifications. Thus the IRP Manager may want to be aware of which MO supports which version. Such scenarios have already been described in 3GPP SA5 contributions (cf. TR 32.830), produced during the ongoing SA5 study on version handling. Of specific interest are the following sections in the TR 32.830: 5.7 (Issue 1), 6.1.2.1 (Use Case 13 (NRM object instance versions)), and 7.2.3 (Solution proposal for Use Case 13)), and the second sub-bullet of section 7.2.3.

The latter is concerned with having the new "nsVersionInfo" attribute in the IOC named "Top" meaning that all instances (could be hundreds of thousands of them in a large installation) will have it. That would mean in a large installation, lots of attributes with the same value data. The reason why all instances will have the new attribute (NsVersionInfo) if placed in the Top IOC (Information Object Class) is that all other IOCs (and thus MOs) inherit from Top. Further background information can be found in the draft TR 32.830-030 (version 0.3.0).

Although one solution has been presented and agreed by SA5 to be included in the draft TR as a possible solution to the problem statement behind the above "Use Case" 13 is well described in this draft TR, a more substantial improvement is needed. In other words, a more efficient solution is needed that would not waste communication network resources, memory- and CPU resources by creating large amounts of duplicated information (attributes) in the Managed Objects.

SUMMARY THE INVENTION

The above objects and mentioned problems are solved by the subject-matter of the independent claims. Preferred embodiments are described in the dependent claims.

According to an embodiment of the present invention, a method for object-oriented network management is provided comprising the steps of defining an information model with one object class for each type of network resource and network entity to be managed; defining, independent from an inheritance hierarchy, a hierarchy tree with a plurality of hierarchy levels, assigning each object class to one hierarchy level, and associating each object class of a lower hierarchy level to one object class of a hierarchy level above said lower hierarchy level; defining, in said information model, an information entity comprising default version information; associating said information entity to one object class of a top hierarchy level or an instance thereof; and assuming said default version information for an instance of said one object class and for all instances of an object class that belongs to lower hierarchy levels and that is associated to said one object class, or an instance thereof, directly or via one or more further object classes.

According to another embodiment of the present invention, a network management entity for object-oriented network management is provided, the network entity comprising a processing unit configured to: define an information model with one object class for each type of network resource and network entity to be managed; define, independent from an inheritance hierarchy, a hierarchy tree with a plurality of hierarchy levels, assign each object class to one hierarchy level, and to associate each object class of a lower hierarchy level to one object class of a hierarchy level above said lower hierarchy level; define, in said information model, an information entity comprising default version information; associate said information entity to one object class of a top hierarchy level or an instance thereof; and assume said default version information for an instance of said one object class and for all instances of an object class that belongs to lower hierarchy levels and that is associated to said one object class, or an instance thereof, directly or via one or more further object classes.

According to further embodiments a network system comprising network resources and network entities to be managed and a network management entity for managing said network resources and network entities, a computer program comprising code for instructing a processing unit to execute the steps of the method embodiments, and a corresponding computer readable medium are provided.

BRIEF DESCRIPTION OF THE DRAWINGS

Embodiments of the present invention, which are presented for better understanding the inventive concepts but which are not be seen as limiting the invention, will now be described with reference to the Figures in which:

FIGS. 5A to 5C show flow charts of method embodiments of the present invention.

DETAILED DESCRIPTION

Figure 1A:
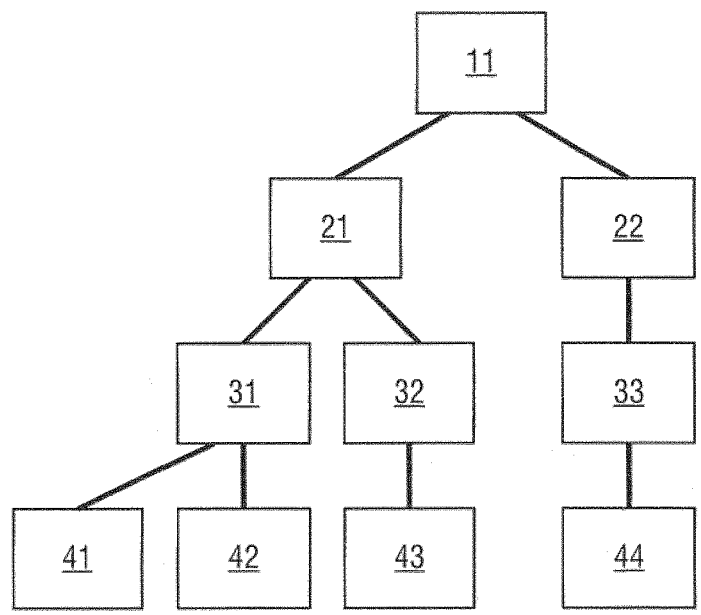
FIG. 1A shows a schematic representation of an inheritance hierarchy tree of managed object classes.

FIG. 1A shows a schematic representation of an inheritance hierarchy tree of managed object classes. As shown, the hierarchy tree originates from a top most level with a corresponding top class 11 and continues downwards with sub-ordinate classes 21 to 44. As shown top class 11 has two direct (immediate) sub classes 21 and 22. The hierarchy tree splits up further below classes 21 and 31.

A common characteristic of object-oriented modeling and programming is the so-called inheritance of properties: Each class being subordinate inherits at least all the properties of the class immediately above. In the shown example, any property of class 11 is common to all subordinate class 21 to 44, whereas an additional property of class 22 is only inherited to subordinate class 33 and 44. Naturally, an instance of class 21 has then all properties as defined in class 21 plus all properties as inherited from class 11.

A property can be any characteristic of the data object being the instance or the corresponding class object. For example, a property can be an attribute to a class/instance, such as a variable or some other set of data. Usually, if the top class is attributed with a 256-byte long string all sub-ordinate classes feature this attribute as well. This makes clear that any addition of characteristics to higher level classes will accordingly multiply the amount of necessary data by the total number of subordinate classes. In the present example, the definition of the 256-byte string will result in a total amount of required data of 256×10 B=2560 B.

Figure 1B:
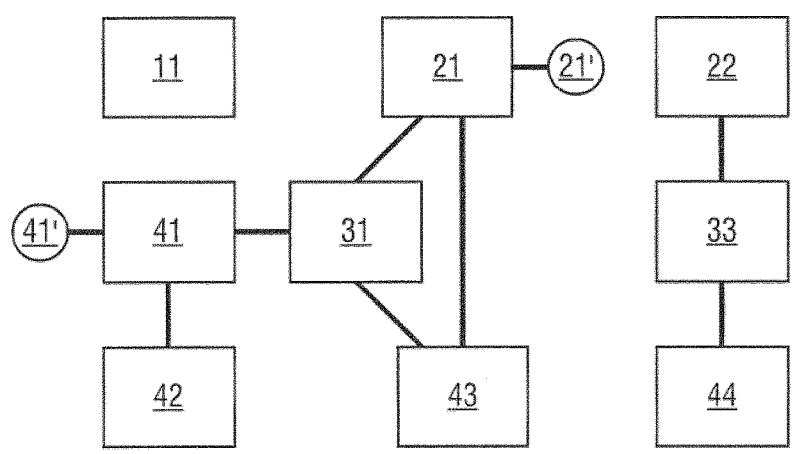
FIG. 1B shows a schematic representation of a containment hierarchy tree of managed object classes according to an embodiment of the present invention.

FIG. 1B shows a schematic representation of a containment hierarchy tree of some of the managed object classes shown in conjunction with FIG. 1A. As can be seen, containment is independent from the inheritance hierarchy. Moreover, there may exist classes, such as the shown class 11, which has no containment relation with no other classes. Moreover, the containment relations can be multiple in the sense that one class can have more than one containment relation to more than one other class.

In the shown example, class 31 has three containment relations, i.e. one each to classes 21, 41 and 43, and class 33 has two containment relations, i.e. one each to classes 22 and 44 independent from their level in the inheritance hierarchy. Further, containment relations may be asymmetric in the sense that they can be traced and resolved only in one direction and that the number of relations in each directions may be restricted. These additional characteristics are usually depicted by numbers and different types of arrow ends as used also for example in the following FIGS. 4A to 4C.

FIG. 1B further shows an information entity 21' being associated to the class 21 which represents the top of the containment hierarchy. This entity 21' comprises the default version information and is described in greater detail below.

Figure 2:
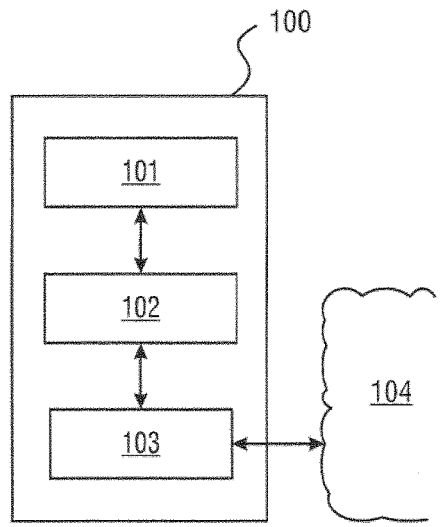
FIG. 2 shows a schematic representation of a network management entity according to an embodiment of the present invention.

FIG. 2 shows a schematic representation of a network management entity according to an embodiment of the present invention. As illustrated, a management entity 100 may comprise a memory unit 101, a processing unit 102 and a network interface 103, operable to communicate with a network 104 so as to, for example, communicate to a management system for managing a network. Also, the shown network 104 can already be the network that is subject to management, i.e. the network 104 connects or makes accessible the network entities and resources as the MOs.

The memory unit 101 may store program code for instructing the processing unit 102 so as to execute one or more steps of any method embodiment and aspect of the present invention. Specifically, the memory unit 101 may store program code for instructing the processing unit 102 so to define an information model with one object class for each type of network resource and network entity to be managed, define, independent from an inheritance hierarchy, a hierarchy tree with a plurality of hierarchy levels, assigning each object class to one hierarchy level, and associate each object class of a lower hierarchy level to one object class of a hierarchy level above said lower hierarchy level, define, in said information model, an information entity comprising default version information, associate said information entity to one object class of a top hierarchy level or an instance thereof, and to assume said default version information for an instance of said one object class and for all instances of an object class that belongs to lower hierarchy levels and that is associated to said one object class, or an instance thereof, directly or via one or more further object classes.

Specifically, the information entity comprising the default version information may appear in the embodiments shown in conjunction with FIG. 1B as information entity 21'. This information entity 21' is associated to the class 21 being the top of the containment hierarchy. According to this embodiment of the present invention, the information entity 21' comprises the default version information that is assumed for class 21 and each subordinate class 31 and 43 (as shown for example in FIG. 1B). Hence, the mere fact that e.g. class 31 as an immediate subordinate to class 21, or class 43 are subordinates to class 21 to which the information entity 21' is associated, results in that the same default version information is assumed also for classes 31 and 43.

With again reference to FIG. 1B, there may also be a subordinate class to which an additional information entity 41' is defined and associated to the subordinate class 41. The mere fact that there is a subordinate class also associated with an additional information entity 41' can imply that for this instance 41, and for all further subordinate instances (in the present example namely class 42) the default version information of the additional information entity 41' is assumed. This default version information of the additional information entity 41' may add to the default version information that is already assumed through the information entity 21' or may well also alter the default version information or parts thereof.

Figure 3:
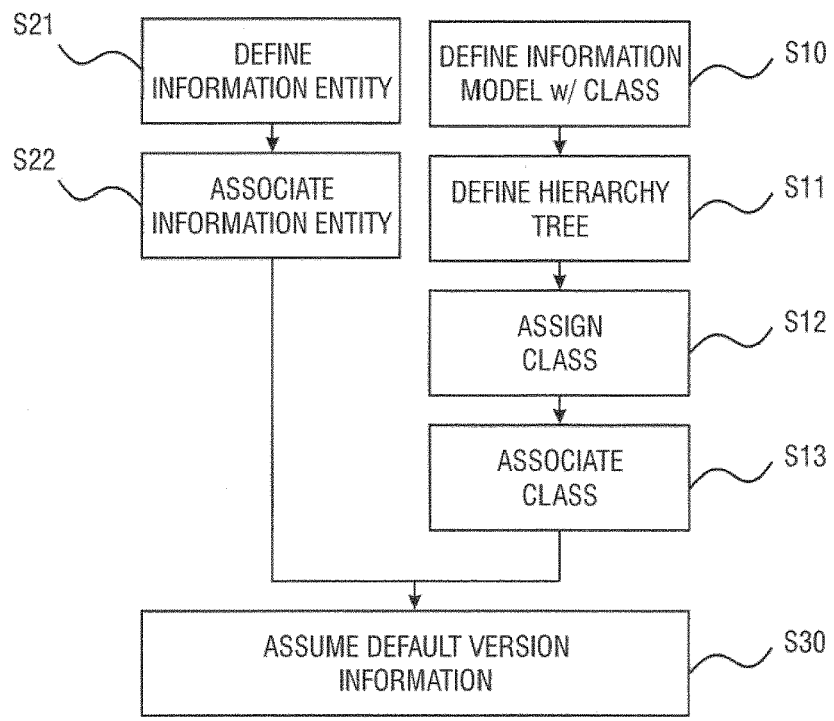
FIG. 3 shows a flowchart according to a method embodiment of the present invention.

FIG. 3 shows a flowchart according to a method embodiment of the present invention. Specifically, this method comprises the step S10 of defining an information model with one object class for each type of network resource and network entity to be managed, the step S11 of defining, independent from an inheritance hierarchy, a hierarchy tree with a plurality of hierarchy levels, a step S12 of assigning each object class to one hierarchy level, and a step S13 of associating each object class of a lower hierarchy level to one object class of a hierarchy level above said lower hierarchy level.

Previously, in parallel, or subsequently an information entity, such as the information entity 21', comprising default version information is defined in said information model (step S21), and this information entity is associated (step S22) to one object class of a top hierarchy level or an instance thereof. In the example of FIG. 1B this would be the level of the top instance 21 of the containment tree. Based on the defined instances, the hierarchy tree, and the information entity, it is then assumed (step S30) said default version information for all or one instance of said one object class and for all instances of an object class that belongs to lower hierarchy levels and that is associated to said one object class, or an instance thereof, directly or via one or more further object classes.

As a result, the default version information can be assumed for the class 21 and all subordinate classes in the containment tree. This has the advantage that default version information can be determined for each instance although the individual instances do not have to inherit any property of any superclass such as Top in 3GPP. Such an inheritance would require additional allocation of data for each instance although the actual information may be the same for many instances resulting in an inefficient use of memory, processing and communication resources. Deviating version information can be implemented by means, for example, the additional information entity 31' as show and described in conjunction with FIGS. 1 and 2.

Figure 4A:
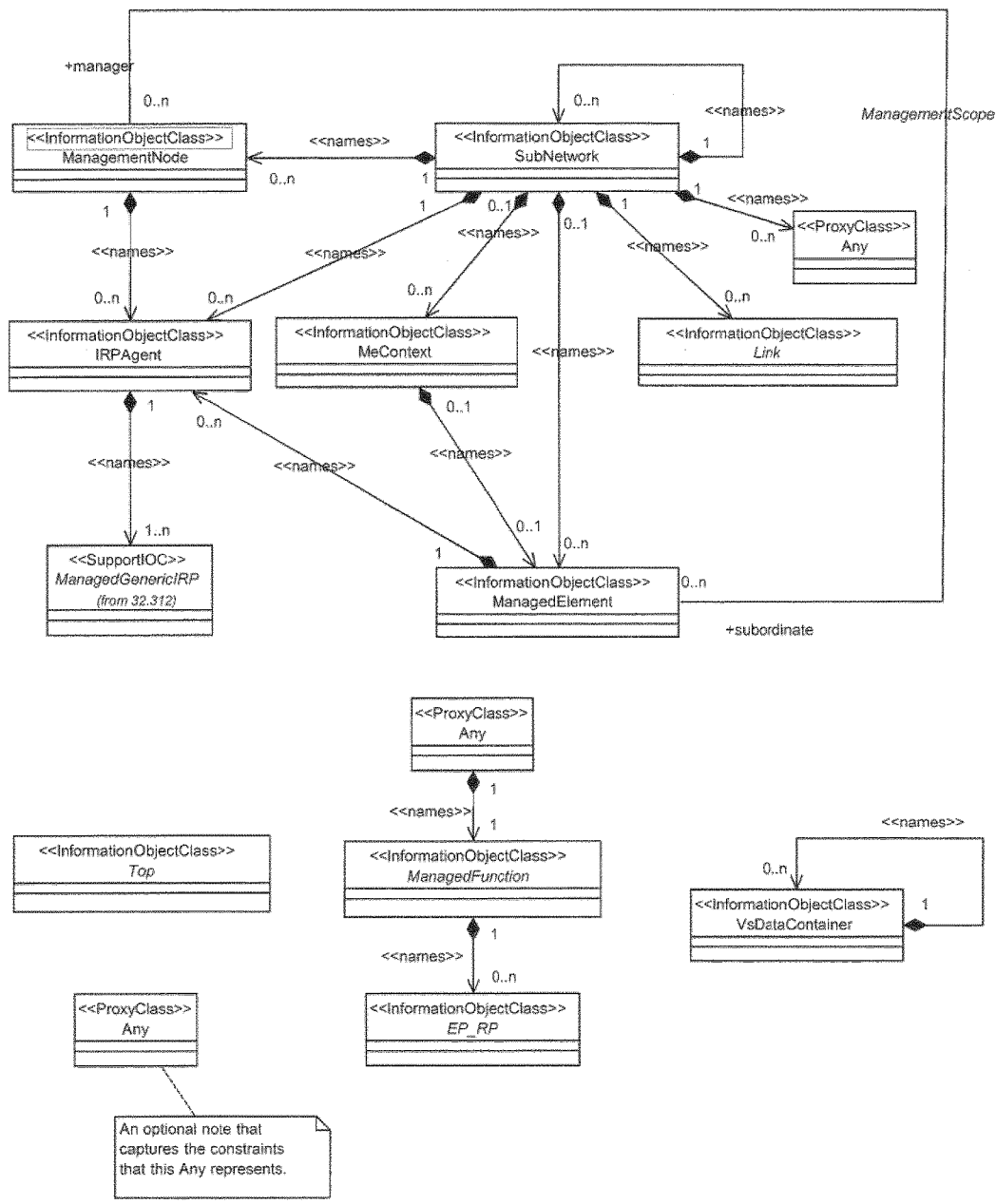
FIGS. 4A and 4B show association diagrams as so-called class diagrams from 3GPP TS 32.622 section 6.1.2 and 32.762 section 6.2.
Figure 4B:
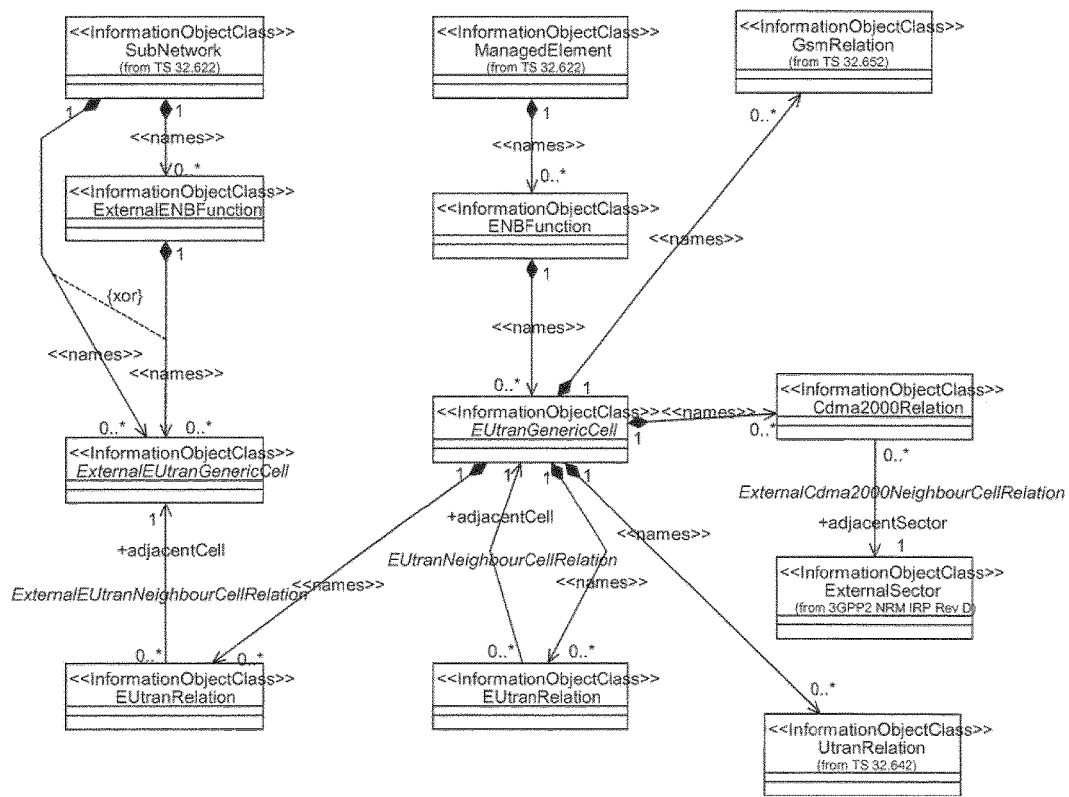
Figure 4C:
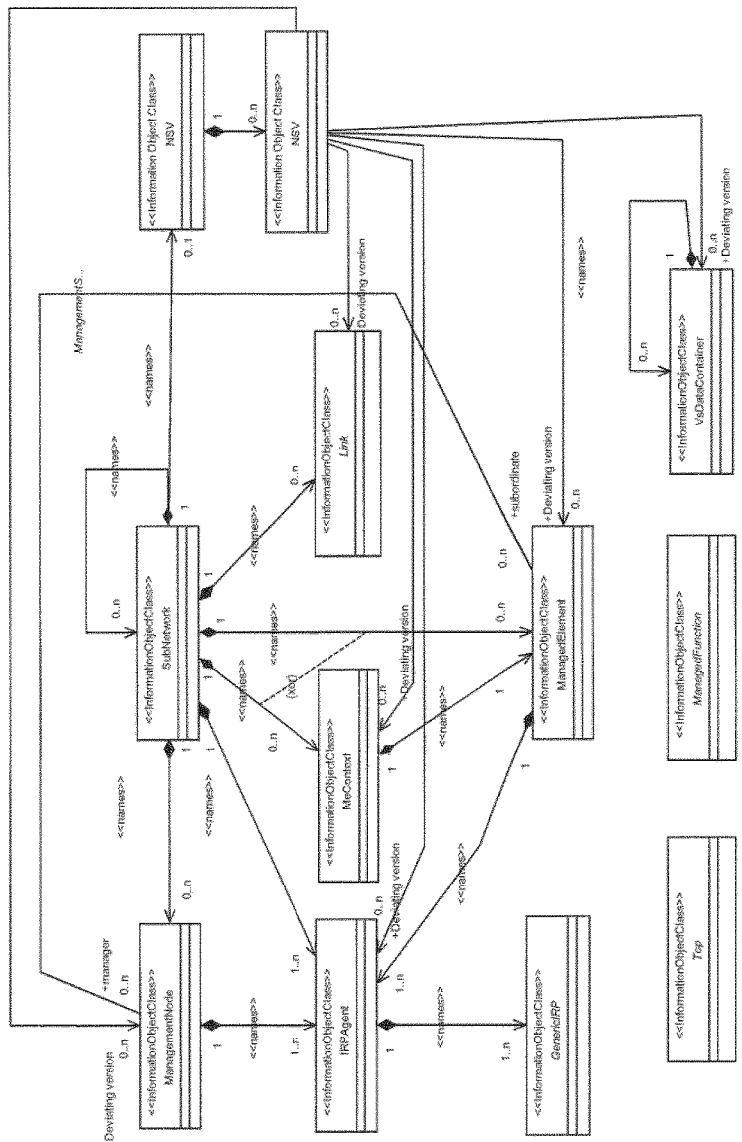
FIG. 4C shows an association diagram as a so-called class diagram of an embodiment of the resent invention.

FIGS. 4A to 4C show examples of containment and association diagrams as so-called class diagrams. The following embodiments of the present invention are directed to the specific context of 3GPP NRM IRPs and Managed Objects, as compared to the above broader and more generic embodiments, in the sense that aspects of the present invention can be equally well applied to any kind of system with an object-oriented information model or database (DB) for network management, with classes and instances (or DB records) representing resources or entities under management (i.e. managed resources or managed entities), e.g. described in Unified Modeling Language (UML) or any other modelling language.

An aspect of the present invention employs the likelihood that most MOs or managed entities in a network which are defined in the same specification (e.g. 3GPP NRM SS) will be of the same specification version. Therefore it may be sufficient if for each specification (e.g. NRM SS), the "namespace" (see 3GPP TR 32.830 for the definition of namespace) and version information (in this case the nsVersionInfo) for the "default version" which most MOs are supporting (have implemented) is defined somewhere in the information model (e.g. NRM) on the top level, associated with the top level class of the information model (e.g. SubNetwork which is the topmost (root) class in a 3GPP NRM), thus allowing such default version information to be identified for each MIB or MIB portion. This would mean that nsVersionInfo is taken as the default version information comprised by the information entity 21' that is associated with the top level class 21 or class 21 as such.

Further, the concept of "namespace" (or "name space") can find be defined in the present context so as to be based on or in line with the respective definition of draft TR 32.830, version 0.3.0. Further, 3GPP TS 32.300 is about name spaces specifying a "container" of identifiers of class instances. In some ways, a namespace can be defined as a container that provides context for the identifiers (names, or technical terms, or words) it holds, and allows the disambiguation of homonym identifiers residing in different namespaces. Here, "name space" is not about the "container" of identifiers of class instances. Rather, it refers to the "container" of identifiers of classes.

Aspects of the present invention further employ the concept of pointing out only the few MOs that are supporting a different version than the default version with deviating version information. This can be for example effected by means of the aforementioned additional information entity 41' being associated to the respective subordinate class 41.

Further, the information entity 21' can also define the new version information in a new class pointing with an association to the related classes, thus ensuring that the solution is backward compatible—existing implementations are not affected if they do not need to supply the version information (e.g. if all MOs are of the same version). Yet still, the advantage is obtained that inheriting of respective properties in the main class structure is not necessary so that substantial memory, processing, and communication resources can be saved by means of avoiding the redundant handling of identical information.

In other words, a new information entity 21' is defined, e.g. as a class, IOC or MOC, which can generally have any name but for the sake of brevity is referred to in the following as "NSV". The entity 21' is associated with the whole information model (e.g. NRM or DB), e.g. by being directly name-contained by the topmost "root" class of the MIB that contains all other MOs in the MIB, directly or indirectly, the topmost "root" class which also can have any name but in the context of 3GPP named "SubNetwork" like in 3GPP.

A corresponding embodiment is shown in FIG. 4C: NSV contains a multi-valued attribute, named NsVersionInfo, holding the default namespace and version information of all supported specifications (e.g. NRM SSs). The contents and legal values of each element of NsVersionInfo is according to the description in section "7.2.3 UC13 (NRM object instance version)" of draft TR 32.830 version 0.3.0, and is capable of indicating one of a number of standard versions or vendor-specific versions, as well as a combination thereof (i.e. a vendor-specific version based on a specific standard version).

One instance of NSV has a special property and can be called the "root NSV instance". It identifies the list of default namespace and version values for all specifications (e.g. NRM SSs) supported by the MOs (or managed entities) in the MIB under management (e.g. a 3GPP MIB contained by a root SubNetwork instance). One piece of information indicates which NSV instance that has the property of being the "root NSV instance". One way to indicate this property could be, in the 3GPP context, that the root SubNetwork instance directly name-contains only one NSV instance being the root NSV instance, and other NSV instances, if any, are contained by the root NSV instance. Another way to indicate this property could be that the root NSV instance has an association to the root MIB instance (e.g. SubNetwork). Yet another way to indicate this property could be a special "flag" (boolean type) attribute in the NSV class indicating "root NSV instance" with value "Yes".

Optionally, other NSV instances may exist (and in the 3GPP case e.g. be directly name-contained by the root NSV instance, or have no association with the topmost root class, or have a special "flag" (boolean type) attribute in the NSV class indicating "root NSV instance" with value "No"). These NSV instances are used to identify fragments of the MIB which deviate from the default namespace and version values. By "fragment of the MIB" is herein meant a sub-tree (part) of the MIB starting at a particular selected MO, including that MO and all MOs directly or indirectly contained by that MO. A respective example is given again by referring to the additional information entity 41' as described in conjunction with FIG. 1B. A corresponding fragment may thus consist of the classes 41 and 42 or the respective MOs.

For each fragment of the MIB where any deviation from the default namespace and specification versions exists, a new instance of NSV (e.g. as additional information entity 41') is created with an association directly to the root (MO) of this fragment (class 41). The NsVersionInfo of that NSV instance contains the namespace and version of the specification (e.g. NRM SSs) deviating from the default value (given by the "root NSV instance"), and supported by the MOs of this fragment. Deviations associated with fragments on "lower containment level" will over-ride deviations identified for fragments higher up in the same branch of the containment tree. These "deviation NSV instances" may not be associated with any MIB root instance (e.g. SubNetwork).

The manager should have pre-configured knowledge of the class definition version of NSV and the MIB root class/(e.g. SubNetwork) which is valid for each MIB, to be able to access them without failure at all times. These classes are supposed to be very stable and rarely, if ever, to be modified.

According to an alternative embodiment, the default namespace and specification version information is pre-defined by the manufacturer and pre-configured at installation time, and therefore does not need to be modeled with a specific NSV instance holding the default namespace and version information. Only the deviating namespace and version information is indicated in the same way as described above. Thus, in this case, the NSV instances can be contained directly by the MIB root instance (e.g. SubNetwork) or just be associated with the MIB or DB in any way.

According to a further alternative embodiment, the namespace and version information is defined in a new attribute of the topmost/root class (e.g. SubNetwork), and therefore no new NSV class is needed. This solution is not backward compatible in 3GPP since the SubNetwork IOC in TS 32.622 needs to be modified. A related solution may thus include (1) a new multi-valued attribute with the same structure and information as the attribute named NsVersionInfo above; (2) a new "multi-valued association" with the same semantics as the associations between NSV and the "deviating" MOs as defined above, but here it has a structure which can contain 0-N associations, each of them with a pointer to the "deviating" MO as well as a related list of "deviating" namespace and specification versions for the MO (and its sub-tree, if option 4 above is chosen), and (3) the manager has pre-configured knowledge of the root instance (e.g. SubNetwork) version, to be able to access it without failure at all times.

According to a further alternative embodiment, the namespace and version information is defined in a new "NsVersionInfo" attribute with the same definition and semantics as above and added to be included in any existing class which: (1) has a recursive structure enabling creation of arbitrary number of instances, (2) can be associated with any MO or fragment for which version information is to be identified, (3) can enable identification of which instance holds the "default namespace and version information" (like the "root NSV instance"), and (4) enables the scope of MOs, for which the default namespace and versions are valid, to be large enough to be useful. That is achieved by the class having a "parent" (containing) class "high enough" in the containment tree, e.g. SubNetwork or ManagedElement in the 3GPP case.

One such example of this embodiment applicable to 3GPP is given here, using the Inventory NRM IRP whose IOCs are defined in 3GPP TS 32.692: The NsVersionInfo attribute is added to the definition of in the InventoryUnit IOC in 32.692, thereby reusing the structure of the Inventory NRM which the manager may already be using to identify "administrative" type of information about the MOs which is semi-permanent (not updated frequently), and mirroring a large portion of the MOs even if not all.

According to this embodiment, InventoryUnit (and other IOCs in this NRM) can only point to ManagedFunction and its derivatives. Therefore this embodiment cannot identify "versions deviating from the default" for those MOs which are not derived from ManagedFunction, and there are a few, e.g.: UtranRelation, EP_RP, EP_IuCS, EP_IuPS, EP_Iur, CellOutage-CompensationInformation, EUtranCellNMCentralizedSON.

However, possible ways to get around this issue are to choose one of the following options: (1) Assume that all MOs whose MOCs are not derived from ManagedFunction are of the same version as the closest (or topmost) MOO in the same containment branch defined in the same NRM SS. (2) Define a <<ProxyClass>> ManagedEntity in the Inventory NRM IRP to which InventoryUnit has an association, representing an optional association to any IOC in any NRM IRP.

Further according to this embodiment, InventoryUnit (and other IOCs in this NRM) are all contained by ManagedElement, so definition of default namespace and version info in a "root InventoryUnit instance" would be valid per ManagedElement instance. So it is defined once per ManagedElement instance, which can be a large number, and cannot be set up once per SubNetwork instance. Further, it cannot define the version information for MOs name-contained by SubNetwork instead of ManagedElement, such as ExternalENBFunction and ExternalEUtranGenericCell.

However, possible ways to get around this issue are to choose one of the following options: (1) Define a new IOC contained by SubNetwork and holding the NsVersionInfo attribute, in the Inventory NRM. But that would mean practically the same solution as the initial solution above. (2) Let the InventoryUnit(s) in one and only one of the ManagedElement instances define the default and possibly deviating versions for all MOs contained by SubNetwork and not ManagedElement. (3) "Move" the containment of InventoryUnit up to be directly name-contained by SubNetwork.

Further according to this embodiment, it can be less straightforward to identify which instance of InventoryUnit that contains the default namespace and version values, since InventoryUnit does not have an association to ManagedElement and there could be 0 . . . n instances of InventoryUnit directly name-contained by one ManagedElement.

However, possible ways to get around this issue are to choose one of the following options: (1) Add an association from InventoryUnit to ManagedElement IOC (or to SubNetwork, if option e) above is chosen). (2) Limit the cardinality for instances of InventoryUnit directly name-contained by one ManagedElement, to 0 . . . 1. (3) Define a new attribute in InventoryUnit which has the semantics of a boolean "flag" to indicate if an instance of InventoryUnit is the "root" instance holding all the default namespace and version values or not.

In summary, a detailed embodiment of the present invention may thus be composed of the steps, actions, and mechanisms as obtained from adding an NsVersionInfo attribute to the InventoryUnit IOC and then selecting any suitable options from the above alternatives.

According to yet a further alternative embodiment, it is indicated that all MOs of the same class (MOC) contained by the same parent MO are of the same (deviating) namespace and version whenever there is a "deviating NSV instance" associated with an MO. This can e.g. be added as an additional indicator (parameter) attached to each namespace and version value in the NSV class with the value "True" set for each namespace and version value in the NSV instance where it applies (i.e. deviating version applies to all MOs of the same MOC contained by the same parent MO), otherwise "False". In 3GPP, this may be particularly useful as long as the MO is of a class directly or indirectly contained by ManagedElement. In this way, the need to create one "deviating NSV instance" for every MO of the same class (that has a namespace and version deviating from default) can be avoided.

As a comparison, FIGS. 4A and 4E show association diagrams as so-called class diagrams from 3GPP TS 32.622 section 6.1.2 and 32.762 section 6.2. It is to be noted, however, that a real MID would be a combination of instances of many such classes contained by SubNetwork and/or ManagedElement.

FIGS. 5A to 5C and 6A to 6D show flow charts of method embodiments and a use thereof. In General, circled letters and numbers denote starting point to which other parts of depicted processes refer via "Goto" steps.

In particular, a step by step instruction is given for implementing embodiments of the present invention, namely for obtaining the correct namespace and version information of each MO in the MIB and subsequently access each MO in the MIB correctly. It is noted that the below teaching would for example be able to handle scenarios 1A and 1B in draft TR 32.830-030 section 6.1.2.1, i.e. the scenarios which both cause failures in the manager if the current standard in the 3GPP TSs, not considering TR 32.830, is used, to work properly without failure caused by wrong version information.

As a prerequisite (step S100/S120 in FIGS. 5A and 5C), the manager, at an initial start-up (i.e. the first time it needs to build up a mirror of the MIB in its memory or database), first completes a procedure using existing standard operations to create a "MIT" (Management Information Tree) for each agent (or the relevant fragments that it wants to manage), which has the same tree structure as the MIB but only containing the identification (e.g. DN) of each MO in each "node" of the tree, and store this MIT in the manager's local memory or database. In a 3GPP context it can be made like this:

Follow the sequence described in draft TR 32.830-030 "Annex A, Use Case 13", using the already standardized (in SA5) access procedures and operations to 1) Access the EP (Entry Point) IRP (3GPP TS 32.362) (its location address is preconfigured in the manager) in every EM, thereby obtaining references to the Kernel CM IRP (32.662) and Basic CM IRP (32.602) in every EM. To the latter the manager can then invoke the operation GetContainment to obtain the Distinguished Names of all MOs in the complete MIB in each EM (or the relevant fragments which it wants to manage), if the correct scope and filter input parameters are used. Using the structured information in the returned list or in all the returned DNs, the manager can thereby build up the complete MIT for each EM (or the relevant fragments which it wants to manage), and store this MIT in the manager's local memory or database. This procedure can be repeated whenever the manager needs to recreate its mirror of the MIT or MIB, or restarting from the relevant step, e.g. (in the 3GPP case) point where it has obtained the reference to Basic CM IRP in every EM. It is to be noted that the above access procedures and operations in 3GPP (GetContainment etc.) are just examples of how the data for each MO can be obtained. However, all object-oriented systems are expected to have corresponding operations to access the same to of information (such as unique managed object identifiers).

After step S100/S120 and the respective actions of the prerequisite are completed, the manager can continue as follows: Obtain in steps S100 all the valid specification namespace and versions applicable to each MO in the MIB of each system, subsystem or network node under management (e.g. Element Manager (EM) or Domain Manager (DM)) using embodiments of the present invention (a more detailed description of this procedure is given in conjunction with FIG. 6B), and attach the namespace and version of each MO to the corresponding "node" in the manager's stored MIT (representing an MO and containing the MO's identification, e.g. DN)—this could be stored in the same form as in the NsVersionInfo attribute element obtained from the agent, or in some local abridged format known to the manager (vendor-specific).

Figure 5A:
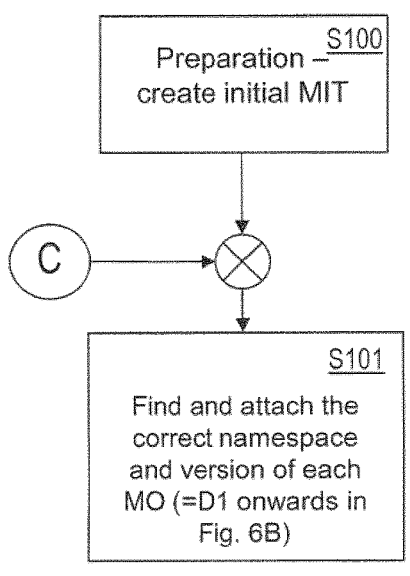

Subsequently, in step S101 in FIG. 5A the correct namespace and version of each MO is found and attached. For this purpose, the steps may be performed that follow the mark D1 in FIG. 6A and that are described there. An alternative process is shown in FIG. 5C in which after step S120 the process continues to the group S121 of steps. The manager can then obtain all attributes in all MOs (of the whole system or all subsystems or network nodes under management), using the relevant version for each MO when reading the data (a more detailed description of this procedure is given in conjunction with FIG. 6B), and store the complete data (all attributes) of all MOs, thereby creating the complete MIB (or again, one or more fragments of it which are relevant for the manager). This could be stored in the same database/memory records as the ones used for the "nodes" of the MIT, thereby converting the MIT to a MIB, or in a new parallel database/memory entity, thus keeping the MIT and the MIB separate. The latter choice means that the manager would need to keep all updates of the MIT synchronized with corresponding updates of the MIB to maintain their consistency.

If a new MO is created by an agent in the MIB at any time, the agent shall send a notification about the creation (e.g. by sending an "object creation notification", in the 3GPP context as defined in Kernel CM IRP) to all managers subscribing to such notifications—and the manager that wants to have up-to-date MIB information needs to subscribe to such notifications. The agent then also needs to update the NSV instances if necessary to reflect the namespace and version information for the new MO, if the default or deviating information in existing NSV instances do not reflect the version of the new MO. This could mean creation of a new NSV instance, or modification of the NsVersionInfo attribute in an existing NSV instance. For each affected NSV instance, a notification indicating the object creation, object deletion or "attribute value change" when applicable shall be submitted (and the manager must subscribe to them if it wants correct version information). For each created MO and NSV instance, the manager needs to go through steps above for the MO. If the manager would miss any of the above notifications, causing MO access failure due to suspected wrong version information, the manager should rebuild its MIT or MIB from start again.

Preferably, no NSV instances shall be modified or deleted unless necessary, but if this happens, the manager needs to go through the complete procedure from above again, for each MO and each NSV instance, in order to ensure correct version information. One typical case when it is advantageous to delete some or all NSV instances, though, is after a major network upgrade is finished (or nearly finished)— then the "root NSV instances" which do not anymore reflect the default version information for the majority of MOs should be deleted and new "root NSV instances" created with the relevant new default version information.

It is to be further noted that the namespace and version information does not necessarily have to be stored in the MIB or MIT at all times—the manager could choose to only store the NSV instances and recreate the relevant namespace/version information for relevant MOs whenever it is needed, e.g. if the processing needed to do that is considered less resource-consuming than the extra MIB/MIT-storage needed for the namespace/version information. This strategy may be particularly useful if the number of deviating versions is zero or low.

Actions and steps as described above are valid if the manager holds a mirror copy of the MIB in a local DB or memory (which is considered as the most common case). If the manager doesn't keep a mirror copy of the whole MIB in its local DB or memory, it can as an alternative choose to keep only the MIT structure in the DB/memory, attaching the correct namespace and version info to each MO (using embodiments of the present invention), and at any time read out the attributes of one or more MOs from the relevant agent when the manager needs this information. If the manager does not have a mirror copy of neither the MIB nor the MIT in its local DB or memory, it can perform the same steps as above every time it needs to find and access an MO.

Figure 6A:
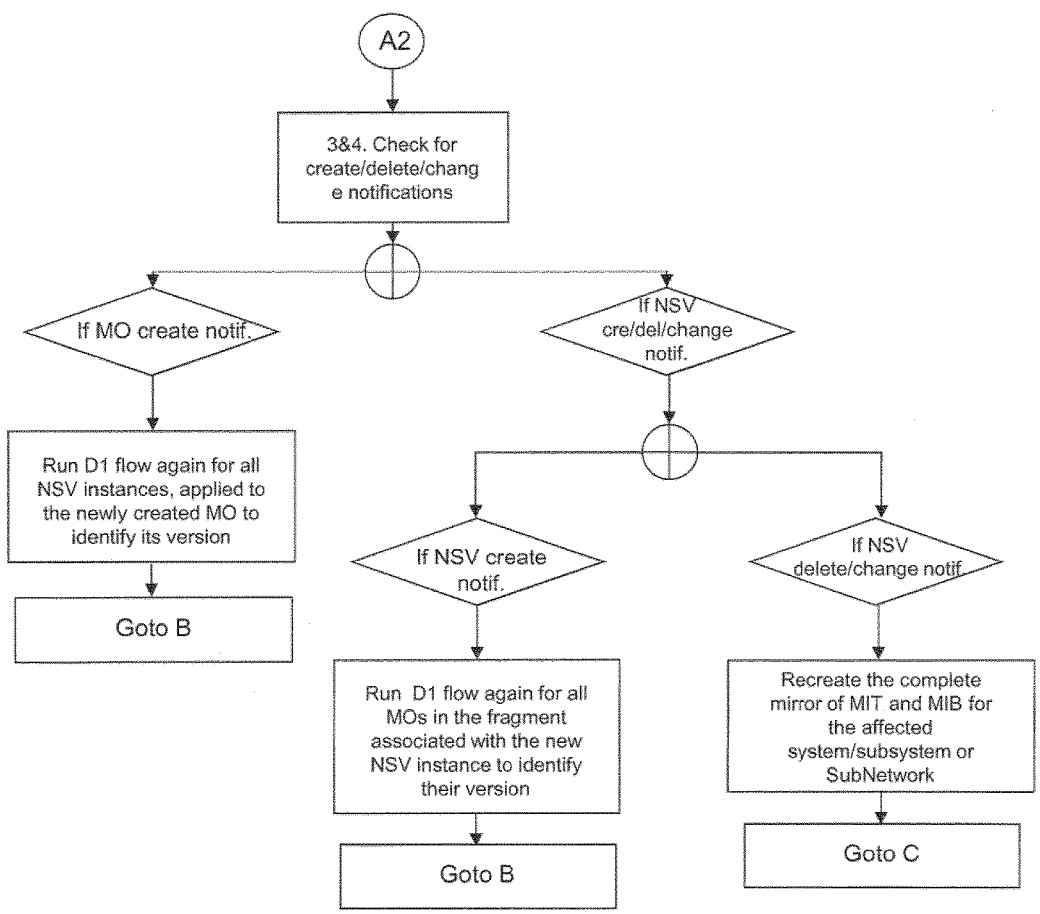
FIGS. 6A to 6D show flow charts of method embodiments of the present invention.
Figure 6B:
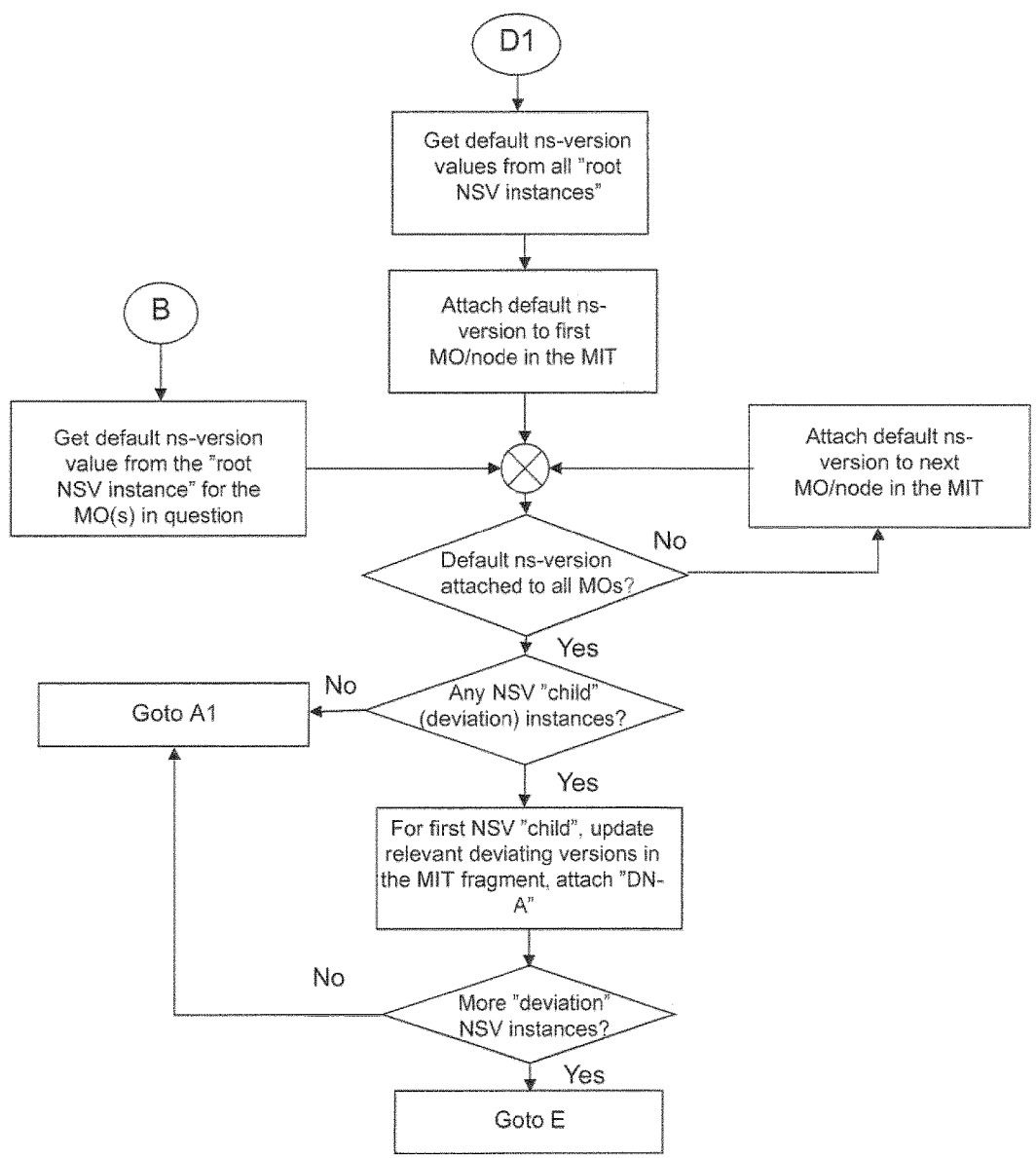

A more detailed embodiment of step S101 is shown in conjunction with FIG. 6B. In particular, this explains how to find and attach the correct namespace and version of each MO to each "node" in the manager's stored MIT. First, the default namespace and version values are read from the "root NSV instance" of the MIB in each system, subsystem or network node (e.g. the SubNetwork in each EM/DM) relevant for the manager. Second, all the obtained default namespace and version value relevant for each MO are attached to each "node" in the MIT (or the MIT fragment(s) relevant for the manager—"MIT fragment" is herein defined in the same way as MIB fragment i.e. the sub-tree of all "MOs/nodes" in the MIT contained by a specified MO/node, including the latter MO/node)—one value for each MO, being the namespace and version of the specification which is relevant for the respective MO, i.e. where the MO's class is defined.

Then, if there are any additional NSV instances indicating one or more deviations from the default namespace and versions (e.g. "children" NSV instances contained by the "root NSV instance"), do the following for these NSV instances as so-called "deviation" NSV instances:

For the first found such "deviation" NSV instance there are two actions: (1) For the MIB fragment associated with this NSV instance, replace the default namespace and version value with the relevant "deviating namespace and version value" (given by this NSV instance) of each NO in that MIB fragment which is supporting one of the specifications relevant to one of the deviating namespace and version values in NsVersionInfo. (2) Letting the identification (e.g. DN) of the MO which is the root of this fragment be called "DN-A", DN-A is stored (attached) together with each MO in this MIT fragment whose namespace and version value was updated in the previous action (1) above (and only these MOs).

Figure 6C:
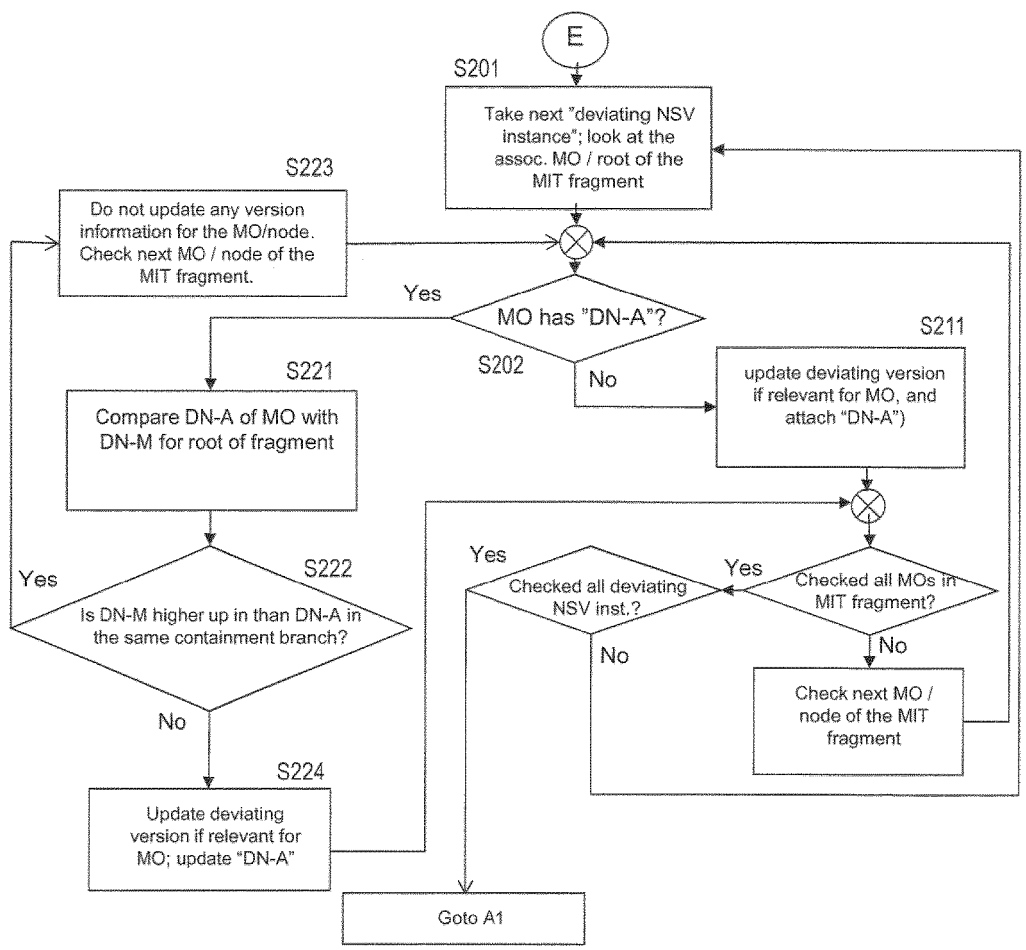
Figure 6D:
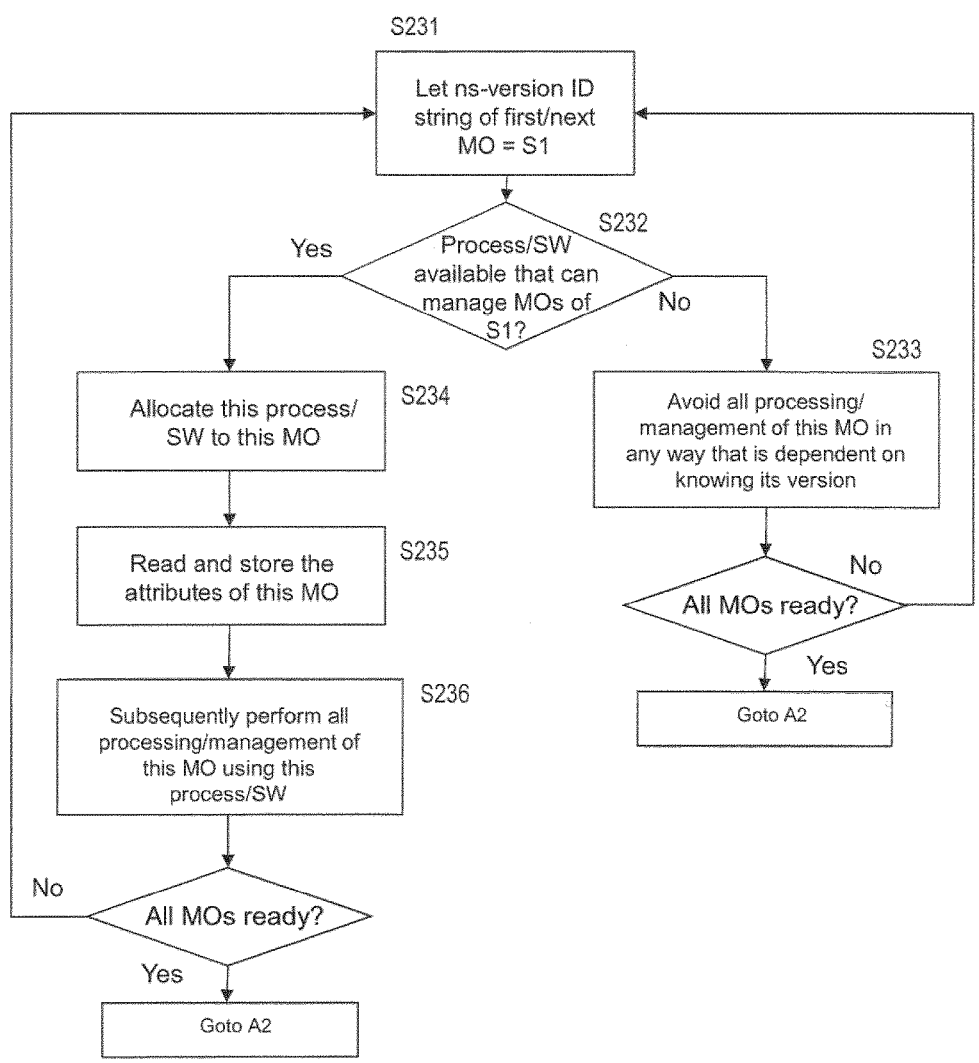

Step S201 in FIG. 6C now shows the further procedure considering each of the following "deviation" NSV instances. In step S202 it is decided whether the MO has "DN-A". For each MO in the MIB fragment associated with the NSV instance (let's call this fragment N), if there is no "DN-A" value attached to the corresponding MO in the MIT, the procedure continues with step S211 and the above actions (1) and (2) as for the first found "deviation" NSV instance are carried out. If there is already a "DN-A" value attached to one or more of the MOs in this MIT fragment N, the procedure continues with step S221.

Thus for each MO in the MIT fragment which has a "DN-A" value attached to it, in step S221, the identification (e.g. DN) of the root MO of fragment N (e.g. denoted as "DN-M") is compared with the "DN-A" value stored for the MO being checked, in order to compare the position of DN-M and DNA in the containment hierarchy. In the case of 3GPP it would only compare the substrings of these two DNs which follow after the MIB root's (e.g. SubNetwork) RDN (Relative Distinguished Name; see 3GPP TS 32,300) portion of the DNs. As an example, these substrings of DN-M and DN-A may be named "DN-M1" and "DN-A1", respectively.

In step S222 it is checked whether DN-M is higher up in the same containment branch than DN-A, If DN-M is higher up than DN-A in the same containment branch (in 3GPP: if DN-M1 is a subset of DN-A1, i.e. DN-A1 is longer than DN-M1 but their initial characters up to the length of DN-M1 are the same), do not update the namespace and version info or DN-A for the MO being checked (step S223). If, however, DN-A is higher up than DN-M in the same containment branch (in 3GPP: DN-M1 is not a subset of DN-A1), and if one of the namespace and version strings in the NSV instance is for the specification defining the checked MO's class, then replace the namespace and version values with the relevant deviating namespace and version value (given by this NSV instance) as well as the DNA value (set to DN-M) for the MO being checked (step S224).

Figure 5B:
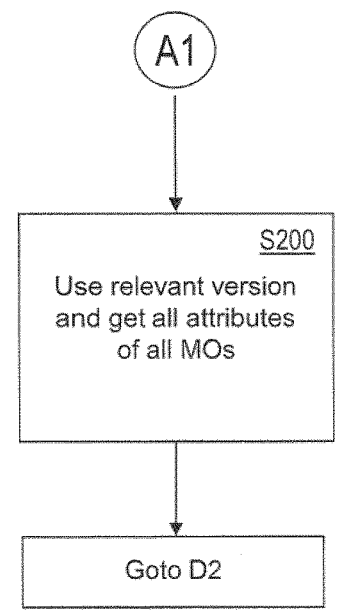

FIG. 5B depicts the use of the relevant version. Specifically, the process starts with the mark A1 and continues with step S200 in which the relevant version is used and all attributes of all MOs are obtained. The process then continues with going to mark D2. A more detailed embodiment of step S200 is shown in conjunction with FIG. 6D for explaining how to use the relevant version for each MO when reading data.

First, in step S231, the namespace and version identification string attached to it in the MIT are checked and denoted as string S1. Then, in step S232, the process (if any available) is allocated which is capable of or designed for interpreting and processing the MOs of the class defined in the specification identified by S1 (or whatever program or piece of software within the manager which is designed to do that), to store and manage the attributes of this MO in the MIB. If no such process or software is available, ignore accessing or processing this MO in any way that is dependent of knowing its version (step S233). The latter provision takes care of scenario 1A in draft TR 32.830-030 section 6.1.2.1 in the sense that it avoids a "crash" or failure for the manager.

However, if such a process or software as is available, the process continues with S234, allocating this process or software. In step S235 the attribute values of the MO are read and stored (e.g. in 3GPP using Basic CM IRP or Bulk CM IRP), for this NO alone or for a number of MOs in one operation or file. Subsequently, in step S236, all further processing and management of this MO is performed (until the MO is deleted) using this process/software. This takes care of scenario 1B in draft TR 32.830-030 section 6.1.2.1 in the sense that it avoids a "crash" or failure for the manager.

In the above, more or less specific embodiments have been described. However, the present invention may also be implemented in a general embodiment for managing a plurality of objects comprising the steps, actions, configurations of defining an instance of each object to be managed; defining a plurality of hierarchy levels, assigning each instance to one hierarchy level, and associating each instance of a lower hierarchy level to one instance of a hierarchy level above said lower hierarchy level; defining an information entity comprising information on default properties; associating said information entity to one instance of a corresponding hierarchy level; and assuming said default properties for said one instance and for each instance that belong to hierarchy levels below said corresponding hierarchy level and that are associated to said one instance directly or via one or more further instances.

In general, one or more of the following advantages can be obtained by embodiments if the present invention. First, it may present a solution to the problem of section 3, use case 13, of the TR 32.830, for any system that has the same problem that the manager needs to know the MO version before it can access (manage) the MO. It is provided a much more efficient solution than the current presented in draft TR 32.830 in terms of communication network resources, memory- and CPU resources, as it does not create large amounts of (or any, in fact) duplicated information in the Managed Objects.

Using the standard method of draft TR 32.830-030, every time the IRPManager needs to read any attribute from any MO, the additional NsVersionInfo attribute will have to be transferred, whether the IRPManager is interested in it or not, since as of today there is no standardized operation (in Basic CM IRP [32.602] or Bulk CM IRP [32.612], which contain the available alternatives for NRM read operations) that can select only one or a few attributes of an MO to read—all attributes of the targeted MO(s) of a read operation will always be returned. (Bulk CM IRP does not have any such selection criteria at all, and although Basic CM IRP has such an input parameter in the "GetMoAttributes" operation, its semantics currently prevents using this parameter).

Therefore, with the huge number of instantiated MOs that can be expected in a modern mobile network (order of millions), even a comparably "small" attribute adds up to considerable amounts of data to always be stored in the MIB and transferred over the data network, increasing the database capacity needs and load, access operation response times, network load and CPU load (for both manager and agent).

Moreover, using the standard method described in TR 32.830-030, since the new NsVersionInfo attribute is placed inside each class, it causes a problem as long as the above limitation exists concerning "no standardized operation exists that can select only one or a few attributes of an MO to read"—then it is not possible to know the version information before accessing each MO, so it becomes a "chicken-and-egg" problem.

The methods described herein can be implemented by computer-readable instructions executed by a processor. The computer-readable instructions can be stored on a non-transitory computer-readable storage medium.

Although detailed embodiments have been described, these only serve to provide a better understanding of the invention defined by the independent claims, and are not to be seen as limiting.

The invention claimed is:

1. A method performed at a network management server comprising a processor and memory operating in a telecommunication operations support system of a telecommunication network, the method comprising the steps of:
   determining an information model and a corresponding object class for each type of network resource operating in the telecommunication network managed by the telecommunications operations support system;
   determining a containment hierarchy tree defining containment relationships between each determined object class for each type of network resource operating in the telecommunication network, the defined containment relationships identifying relationships between the determined object classes independent of a plurality of hierarchy levels of the containment hierarchy tree, the plurality of hierarchy levels assigning each determined object class to one hierarchy level, with each determined object class of a lower hierarchy level to a determined one object class of a hierarchy level above the lower hierarchy level;
   determining default version information defining at least one determined object class at a top hierarchy level of the plurality of hierarchy levels of the containment tree;
   assigning the default version information to all subordinate object classes in the hierarchy level of the at least one determined object class at the top hierarchy level, instances thereof, and to all object classes having a defined containment relationship with the at least one determined object class without requiring the subordinate object classes to inherit all properties of the at least one determined object class; and
   communicating the determined containment hierarchy tree comprising the assigned default version information to a database of the telecommunication operations support system operating in the telecommunication network to enable the telecommunication operations support system to perform efficient network management of the network resources operating in the telecommunication network.

2. The method according to claim 1 further comprising:
   determining deviating version information defining at least one determined object class at a hierarchy level lower than the top hierarchy level of the plurality of hierarchy levels of the containment tree;
   assigning the deviating version information to all subordinate object classes in the hierarchy level of the at least one determined object class lower than the top hierarchy level of the plurality of hierarchy levels of the containment tree; and
   assigning the default version information to all instances of the at least one determined object class at the top hierarchy level and to all instances of object classes that belong to hierarchy levels lower than the top hierarchy level and higher than the hierarchy level lower than the top hierarchy level.

3. The method according to claim 1, wherein each network resource operating in the telecommunication network are associated with managed objects of the telecommunication network and an instance for each managed object of the managed objects is from a managed object class.

4. The method according to claim 1, wherein the containment hierarchy tree is stored in a management information base located in a database of the telecommunication operations support system.

5. The method according claim 4, wherein the method further includes mirroring the management information base to a management information tree stored in a database of the telecommunication operations support system.

6. The method according to claim 1, wherein the default version information indicates a standard version of operation that each type of the network resource complies to when operating in the telecommunication network.

7. The method according to claim 1, wherein the default version information is defined in an information entity that is an object class instance independent from the instance of the at least one determined object class at the top hierarchy level and other instances of the at least one determined object class thereof.

8. The method according to claim 7, wherein the information entity has a property capable identifying an association to the top hierarchy level or the at least one determined object class thereof.

9. The method according to claim 8, wherein the property is a Boolean flag.

10. The method according to claim 1, wherein said information entity is an attribute added to an existing class.

11. A network management server operating in a telecommunications operations support system of the telecommunication network, the network management server comprising a at least one processor and memory configured to:
   determine an information model and a corresponding object class for each type of network resource operating in the telecommunication network managed by the telecommunications operations support system;
   determine containment hierarchy tree defining containment relationships between each determined object class for each type of network resource operating in the telecommunication network, the defined containment relationships identifying relationships between the determined object classes independent of a plurality of hierarchy levels of the containment hierarchy tree, the plurality of hierarchy levels assigning each determined object class to one hierarchy level, with each determined object class of a lower hierarchy level to a determined one object class of a hierarchy level above the lower hierarchy level;

determine default version information defining at least one determined object class at a top hierarchy level of the plurality of hierarchy levels of the containment tree;

assign the default version information to all subordinate object classes in the hierarchy level of the at least one determined object class at the top hierarchy level, instances thereof, and to all object classes having a defined containment relationship with the at least one determined object class without requiring the subordinate object classes to inherit all properties of the at least one determined object class; and communicate the determined containment hierarchy tree comprising the assigned default version information to a database of the telecommunication operations support system operating in the telecommunication network to enable the telecommunication operations support system to perform efficient network management of the network resources operating in the telecommunication network.

12. A network system comprising network resources to be managed and network management server according to claim 11 for efficient management of the network resources in the network system.

13. A computer program product comprising a non-transitory computer readable medium storing program code for instructing a processor to execute the steps of the method according to claim 1.

14. The method of claim 7, wherein the information entity identifies a list of default values for all specifications supported by each type of network resource operating in the telecommunication network corresponding to the instance of the at least one determined object class at the top hierarchy level and other instances of the at least one determined object class thereof.

15. The method of claim 2, wherein the deviating version information is defined in an information entity that is an object class instance independent from the instance of the at least one determined object class lower than the top hierarchy level and other instances of the at least one determined object class lower than the top hierarchy level thereof.

16. The method of claim 2, wherein the default version information comprises a namespace and version of a specification shared by the instance of the at least one determined object class at the top hierarchy level and other instances of the at least one determined object class thereof.

17. The method of claim 16, wherein the deviation version information comprises a different namespace and a different version of the specification of the default version information shared by the at least one determined object class lower than the top hierarchy level and other instances of the at least one determined object class lower than the top hierarchy level thereof.

* * * * *